(12) United States Patent
Leigh et al.

(10) Patent No.: US 10,530,482 B2
(45) Date of Patent: Jan. 7, 2020

(54) OPTICAL TRANSCEIVER HAVING SWITCHABLE MODES CORRESPONDING TO DIFFERENT DATA BANDWIDTHS

(71) Applicant: Hewlett Packard Enterprise Development LP, Houston, TX (US)

(72) Inventors: Kevin B. Leigh, Houston, TX (US); David Olson, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/551,310

(22) Filed: Aug. 26, 2019

(65) Prior Publication Data

US 2019/0379458 A1    Dec. 12, 2019

Related U.S. Application Data

(62) Division of application No. 15/664,003, filed on Jul. 31, 2017, now Pat. No. 10,404,377.

(51) Int. Cl.
*H04B 10/40* (2013.01)
*H04Q 11/00* (2006.01)
(Continued)

(52) U.S. Cl.
CPC ......... *H04B 10/40* (2013.01); *H04B 10/2581* (2013.01); *H04J 14/0278* (2013.01); *H04Q 11/0005* (2013.01); *H04Q 11/0062* (2013.01); *H04Q 2011/0016* (2013.01); *H04Q 2011/0075* (2013.01)

(58) Field of Classification Search
CPC ............. H04B 10/40; H04B 10/2581; H04B 10/0705; H04J 14/0278; H04Q 11/0005; H04Q 11/0062; H04Q 2011/0075; H04Q 2011/0016

See application file for complete search history.

(56) References Cited

U.S. PATENT DOCUMENTS 7,599,619 B2    10/2009    Strasser et al.
8,761,027 B2     6/2014    Brooks et al.
(Continued)

OTHER PUBLICATIONS

Twain, E., "23G Ethernet Q&A," (Web Page), May 19, 2016, 7 pages, http://opticalfiberalsa.over-blog.com/2016/05/25g-ethernet-q-a.html.

*Primary Examiner* — Ted M Wang
(74) *Attorney, Agent, or Firm* — Hewlett Packard Enterprise Patent Department (57) ABSTRACT

An optical transceiver includes electrical inputs that each correspond to a selected port of a number of network ports and a selected network lane of the selected port. The optical transceiver includes optical transmitters organized in groups to optically transmit data received at the inputs over a plurality of optical transmission fibers to which the groups correspond. The optical transceiver includes multiplexers corresponding to the transmission fibers. Each multiplexer is to wave-division multiplex the data transmitted by the transmitters within the group corresponding to the transmission fiber to which the multiplexer corresponds. The optical transceiver includes hardware logic to differently map the inputs to the transmitters according to a selected mode of a number of switchable modes corresponding to different data transmission bandwidths.

12 Claims, 8 Drawing Sheets

(51) Int. Cl.
*H04B 10/2581* (2013.01)
*H04J 14/02* (2006.01)

(56) References Cited

U.S. PATENT DOCUMENTS

| | | |
|---|---|---|
| 9,497,518 B2 | 11/2016 | Mills |
| 9,553,670 B2 | 1/2017 | Nagarajan |
| 2002/0021464 A1 | 2/2002 | Way |
| 2008/0019693 A1 | 1/2008 | Sorin |
| 2011/0188853 A1* | 8/2011 | Schimpe ............ H04J 14/0208 398/38 |
| 2012/0082458 A1 | 4/2012 | Bouda et al. |
| 2017/0093484 A1* | 3/2017 | Schmidt ................ H04B 10/03 |

* cited by examiner

OPTICAL TRANSCEIVER HAVING SWITCHABLE MODES CORRESPONDING TO DIFFERENT DATA BANDWIDTHS

CROSS-REFERENCE TO RELATED APPLICATIONS

This application is a divisional application of and claims priority to application Ser. No. 15/664,003, filed on Jul. 31, 2017, the contents of which is hereby incorporated by reference in its entirety.

BACKGROUND

Data centers can employ optical transceivers and optical fibers for high bandwidth connections over relatively long distances. Optical transmitters modulate electrical signals into optical signals that optical fibers carry to optical receivers, which demodulate to produce the electrical signals and the information they contain. An optical fiber generally has multiple lanes, each of which carries optical signals. Optical fiber connections can also be used to connect different chassis or systems together within a network.

DETAILED DESCRIPTION

As noted in the background section, optical fibers can be employed to interconnect different systems together. For example, optical fibers can be used to interconnect a switch to one or more server computing devices. An optical transceiver is present at the switch (i.e., switch-side) as well as at the server(s) (i.e., server-side). Each optical transceiver can include an optical transmitter to transmit optical signals onto optical fibers, and an optical receiver to receive optical signals on other optical fibers.

Optical transceivers can be expensive, both from a capital expense perspective (i.e., acquisition cost) and an operating expense perspective. Employing an optical transceiver per server, for instance, may be cost prohibitive within many data centers. Such expense may limit the deployment of optical communication within data centers that otherwise would benefit from them. Switches are likewise expensive. A switch that serves few servers, for instance, may also be cost prohibitive within many data centers.

Disclosed herein are techniques that provide for both lower-cost optical transceivers as well as lower-cost switches. As to the former, server-side optical transceivers described herein can be shared by a number of servers, which decreases costs by amortizing the cost of each server-side optical transceiver over multiple servers. As to the latter, the techniques described herein permit more servers to connect to the same switch, which also decreases costs by amortizing the equipment and management costs of each switch over more servers.

The techniques described herein provide flexibility in switch-side and server-side optical transceivers. Specifically, the techniques permit selection among a number of switchable modes depending on the number of servers connected to a switch, how the servers are connected to the switch, and the desired data transmission between the switch and each server. Therefore, the same switch-side and/or server-side optical transceiver can be employed in multiple architectural network topologies.

Figure 1:
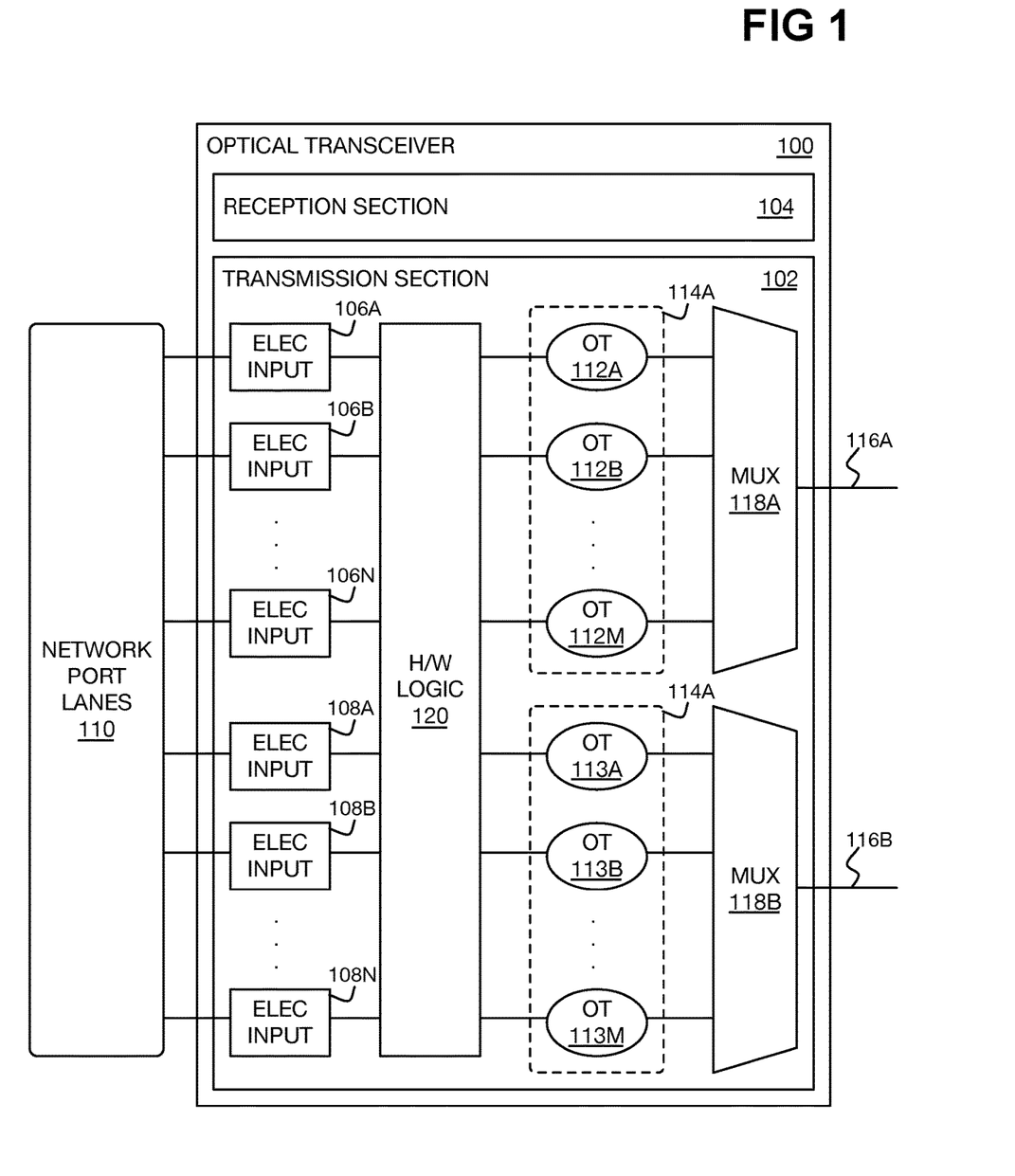
FIG. 1 is a diagram of an example optical transceiver that can map electrical inputs to optical transmitters according to a selected mode of a number of switchable modes that correspond to different data transmission bandwidths.

FIG. 1 shows an example optical transceiver 100. The optical transceiver 100 can be used switch-side or server-side. The optical transceiver 100 includes a transmission section 102 and a reception section 104; however, just the transmission section 102 is depicted in detail in FIG. 1. The reception section 104 is structurally identical to the transmission section 104, but includes demultiplexers and electrical outputs instead of multiplexers and electrical inputs. Furthermore, whereas the transmission section 104 transmits data optically, the reception section 104 receives data optically.

The transmission section 102 of the optical transceiver 100 includes electrical inputs 106A, 106B, . . . , 106N, which are collectively referred to as the inputs 106, and electrical inputs 108A, 108B, . . . , 108N, which are collectively referred to as the inputs 108. The inputs 106 and 108 are each connected and correspond to one of a number of network port lanes 110. The network port lanes 110 are network lanes of network ports, which may be part of a network switch chip, a network controller chip in a server, traces from a blade server chassis mid-plane, cables from servers in a rack, and so on.

The transmission section 102 of the optical transceiver 100 includes optical transmitters 112A, 112B, . . . , 112M, which are collectively referred to as the transmitters 112, and optical transmitters 113A, 113B, . . . , 113M, which are collectively referred to as the transmitters 113. The optical transmitters 112 and 113 are respectively organized within groups 114A and 114B, which are collectively referred to as the groups 114. The optical transmitters 112 optically transmit data received at the electrical inputs 106 over an optical fiber 116A, and the optical transmitters 113 optically transmit data received at the electrical inputs 108 over an optical fiber 116B. The optical fibers 116A and 116B are collectively referred to as the optical fibers 116, and may be referred to as transmission fibers because the optical transceiver 100 transmits data thereover (although a corresponding optical transceiver also connected to the optical fibers 116 receives the data that the transceiver 100 transmits).

The transmission section 102 of the optical transceiver 100 includes multiplexers 118A and 118B, which are collectively referred to as the multiplexers 118, and which respectively correspond to the fibers 116A and 116B. The multiplexer 118A wave-division multiplexes the data transmitted by the transmitters 112 within the group 114A. The wave division multiplexing that the multiplexer 118A performs means that each different transmitter 112 transmits data over a different wavelength on the fiber 116A. The multiplexer 118B likewise wave-division multiplexes the data transmitted by the transmitters 113 within the group 114, and this multiplexing means that each different transmitter 113 transmits data over a different wavelength on the fiber 116B. Therefore, the multiplexers 118 each multiplex the data transmitted by the transmitters 112 and 113 within the group 114 corresponding to the optical fiber 116 to which the multiplexer in question corresponds. The groups 114 in which the transmitters 112 and 113 are organized can be equal in number of the optical fibers 116, which is also the case with the multiplexers 118.

The hardware logic 120 may be implemented as an integrated circuit (IC), like an application-specific IC (ASIC) or a field-programmable gate array (FPGA), or as a general-purpose processor that executes program code from a non-transitory computer-readable data storage medium. The hardware logic 120 differently maps the electrical inputs 106 to the optical transmitters 112 and 113 according to a selected mode of a number of switchable modes that correspond to different data transmission bandwidths. The optical transceiver 100 may communicate or negotiate with another optical transceiver also connected to the optical fibers 116 to choose the selected mode from the switchable modes available, which may be based on the desired data transmission bandwidth desired, how and the number of servers and/or switch network ports are connected to optical transceivers (i.e., how the servers are connected to the transceivers), how an optical cable interconnects the transceivers, and so on. Each switchable mode differently maps the electrical inputs 106 to the groups 114 of the optical transmitters 112 and 113.

For instance, there may be two or three switchable modes. In a first switchable mode, the base data transmission bandwidth may be the amount of bandwidth that can be sent from or received at a network lane of a network port. For example, this bandwidth may be twenty-five gigabits per second (Gbps). To instead achieve twice this bandwidth by one device, such as fifty Gbps by one server, two network lanes of the at least one network port of the device may be used, in a second switchable mode. To achieve four times this bandwidth, such as one-hundred Gbps, four network lanes of at least one network port may be used, in a third switchable mode. There may be three switchable modes when each network port has four available lanes, whereas there may just two switchable modes when each port has two available lanes. To switch from a current selected mode to a new selected mode of the switchable modes, the logic 120 thus remaps the inputs 108 from the transmitters 112 and 113 to which the inputs 108 are mapped in the current mode to the transmitters 112 and 113 to which the inputs 108 are mapped in the new mode.

Figure 2:
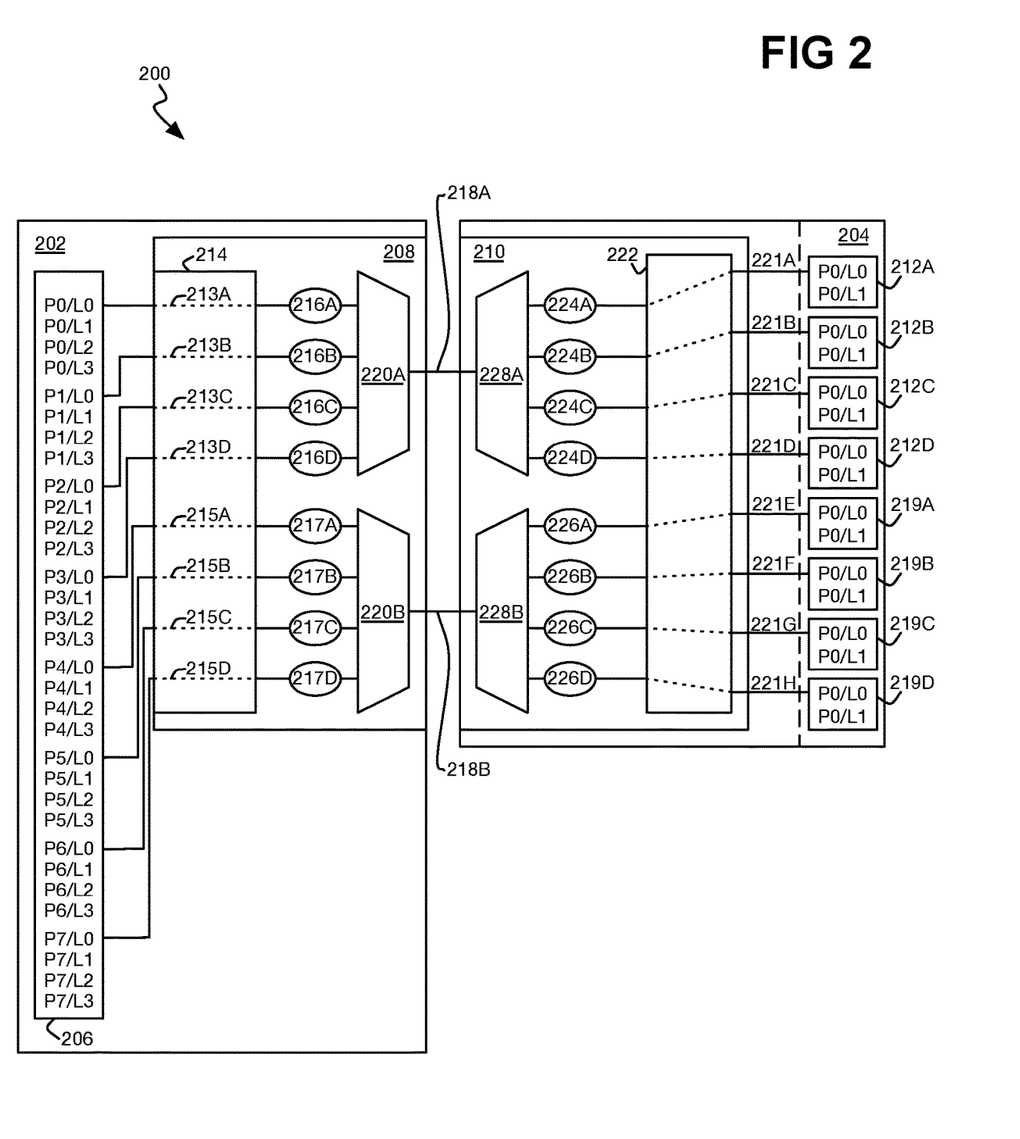
FIGS. 2 and 3 are diagrams of different example systems that can include the optical transceiver of FIG. 1 and in which the selected mode is a first switchable mode corresponding to a base data transmission bandwidth.
Figure 3:
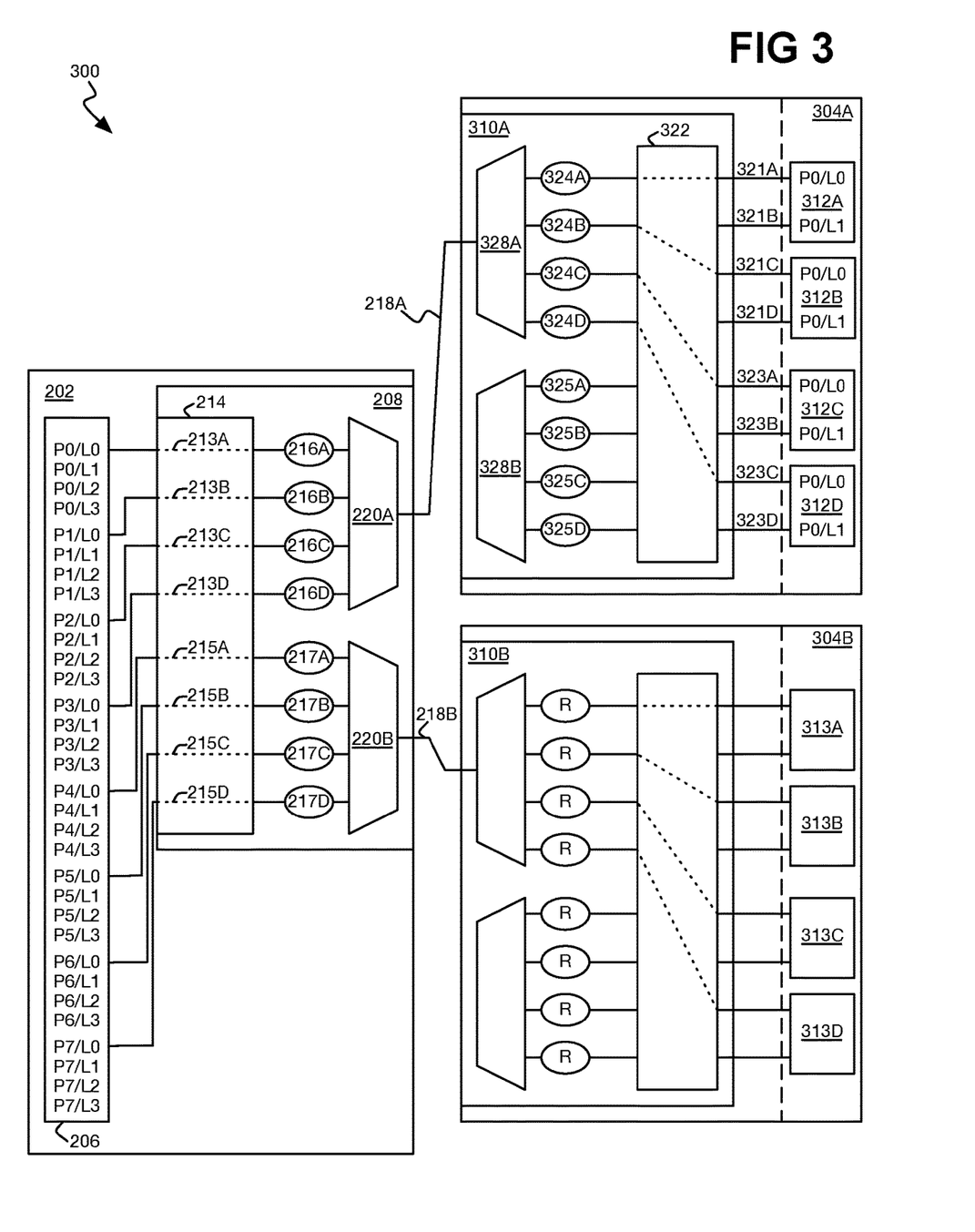
Figure 4:
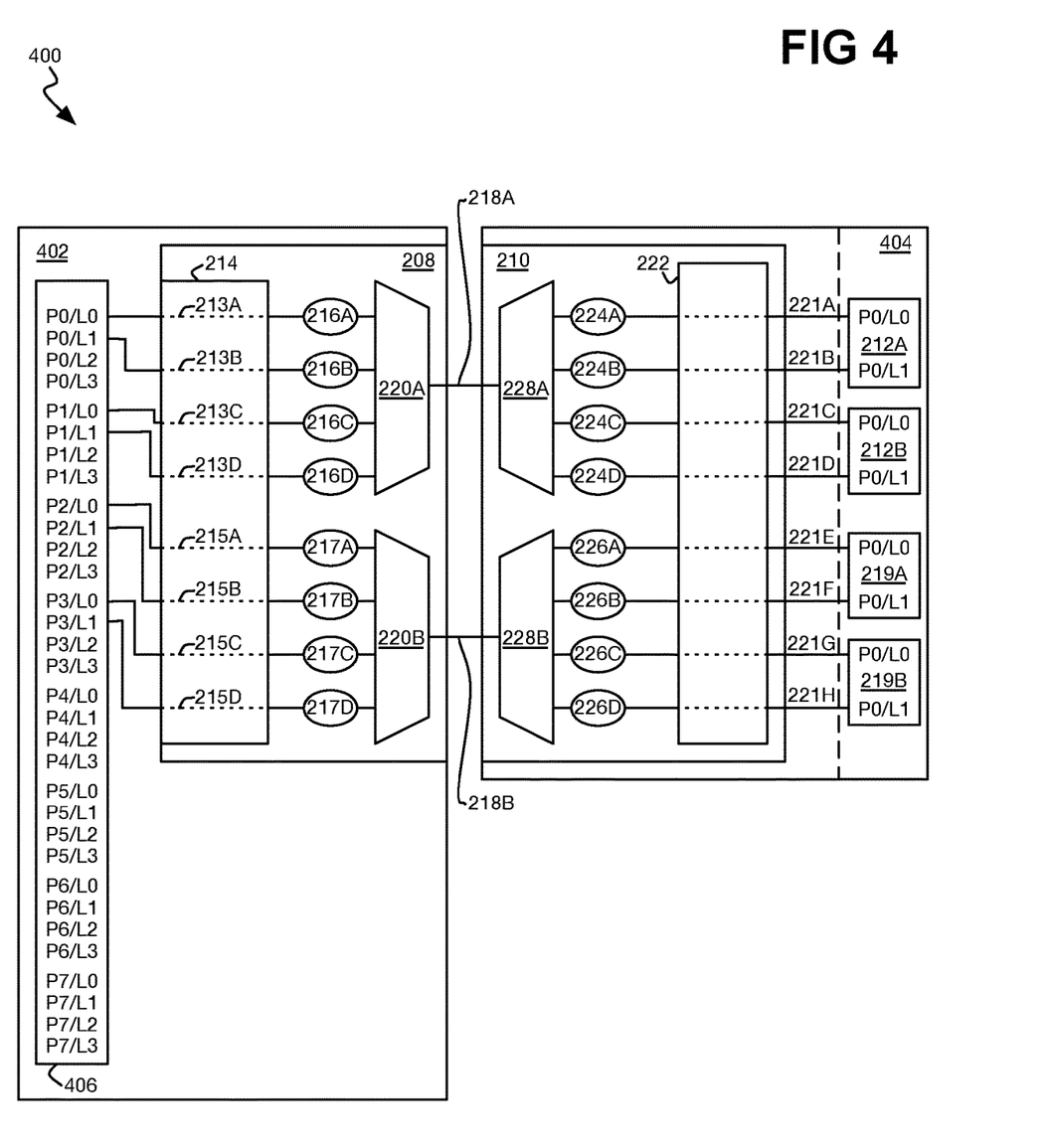
FIGS. 4 and 5 are diagrams of different example systems that can include the optical transceiver of FIG. 1 and in which the selected mode is a second switchable mode corresponding to twice the base data transmission bandwidth of FIGS. 2 and 3.
Figure 5:
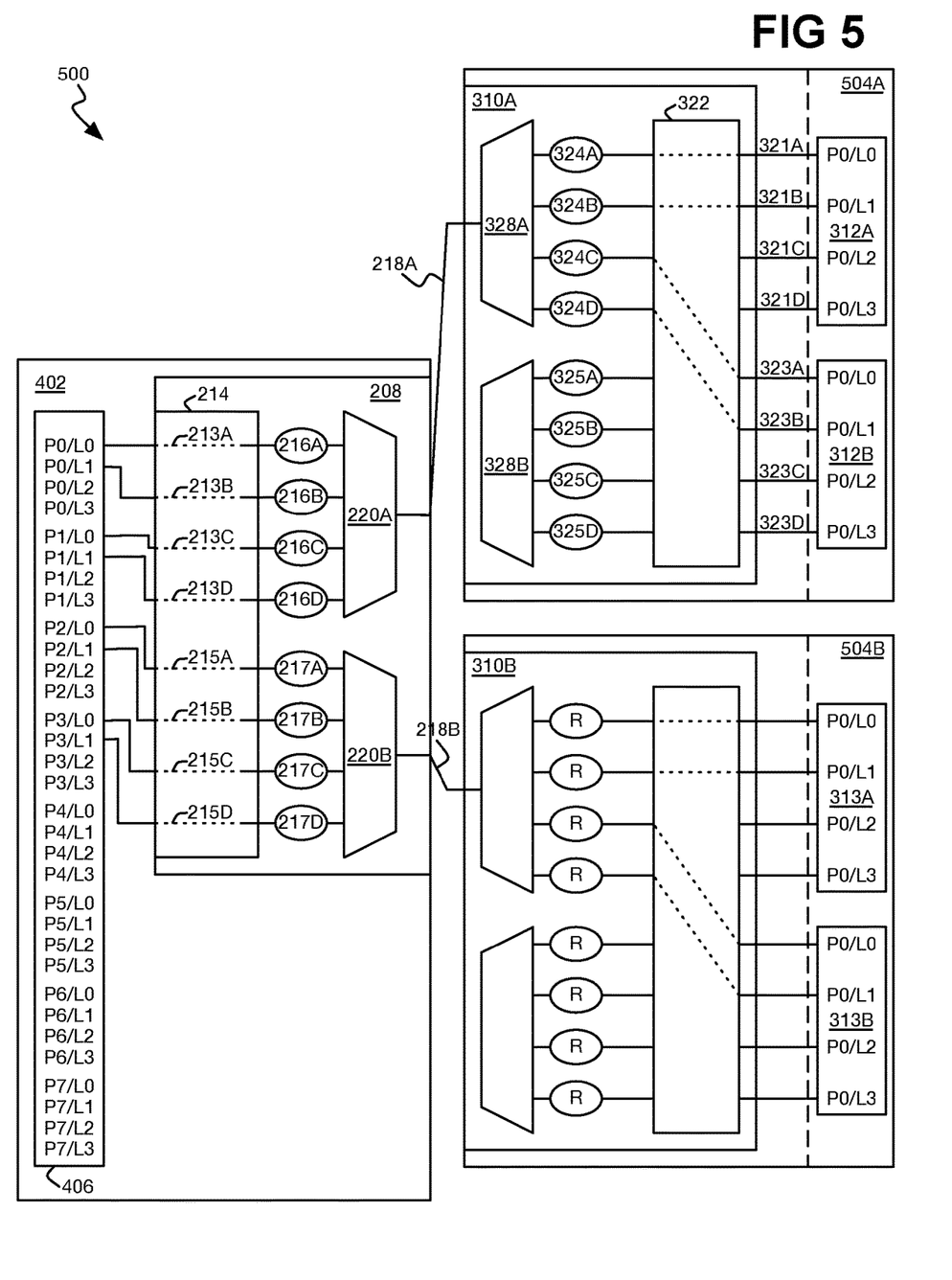
Figure 6:
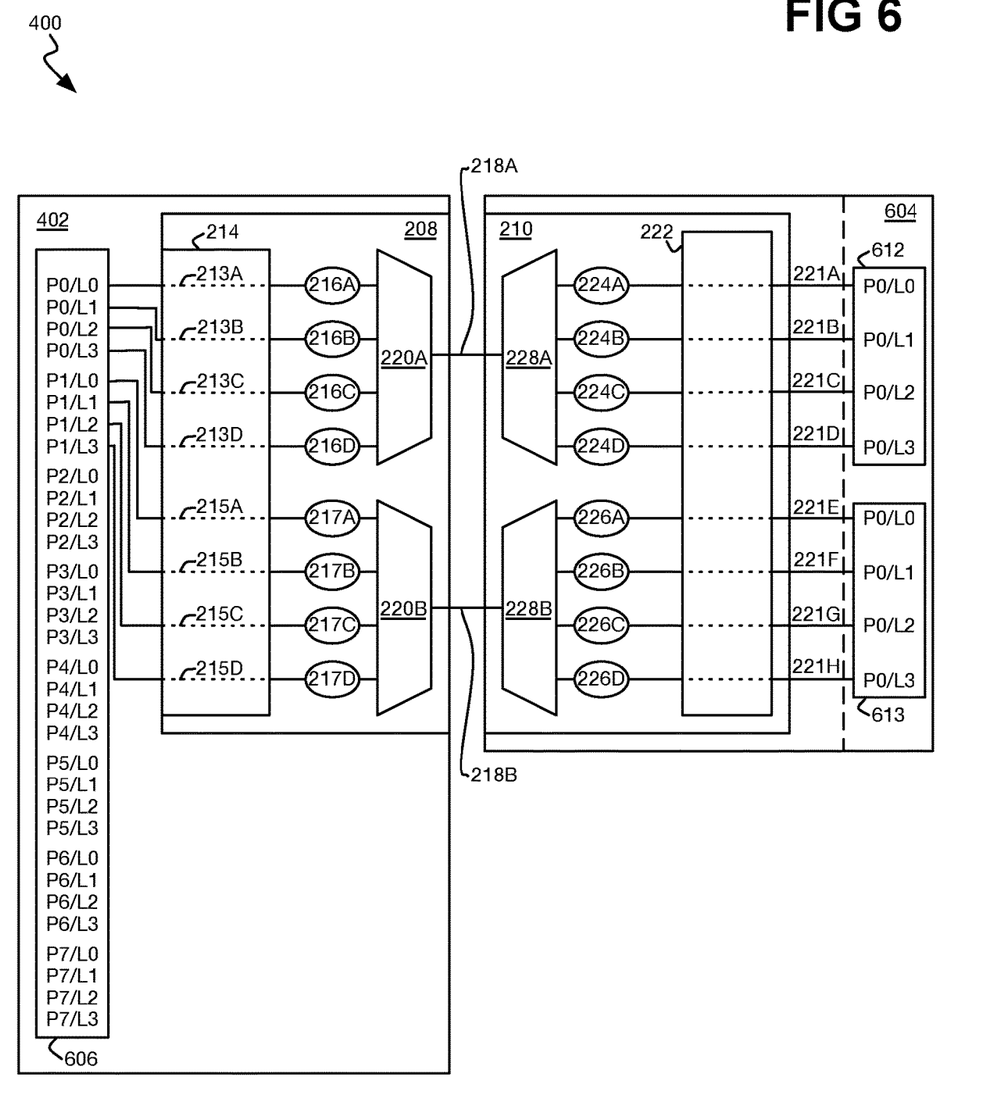
FIG. 6 is a diagram of an example system that can include the optical transceiver of FIG. 1 and in which the selected mode is a third switchable mode correspond to four times the base data transmission bandwidth of FIGS. 2 and 3 and thus twice the data transmission bandwidth of FIGS. 4 and 5.

FIGS. 2 and 3 show different examples of the first switchable mode, FIGS. 4 and 5 show different examples of the second switchable mode, and FIG. 6 shows an example of the third switchable mode. In each of these figures, optical transmission of data just from a switch to multiple servers— and not from the servers to the switch—is depicted for illustrative clarity and convenience. As such, just the components at the switch side (i.e., the transmission section) and at the server side (i.e., the reception section) by which optical transmission of data from the former to the latter are depicted in FIGS. 2-6. However, optical transmission of data from the servers to the switch also can occur in the same manner, using the components at the switch (i.e., the reception section) and at the server side (i.e., the transmission section) by which such optical transmission of data from the latter to the former occurs. Such server-to-switch optical transmission over reception optical fibers corresponding to the same lane-mapped transmission optical fibers.

FIGS. 2 and 3 show example systems 200 and 300, respectively, in which switch-side and server-side optical transceivers operate according to the first switchable mode. The systems 200 and 300 include a switch side 202. The system 200 of FIG. 2 includes one server side 204, which may be a server frame like a blade server chassis mid-plane or a server rack. By comparison, the system 300 of FIG. 3 includes two server sides 304A and 304B, which are collectively referred to as the server sides 304, and which may each be a server frame like a blade server chassis mid-plane or a server rack.

The switch side 202 of the systems 200 and 300 of FIGS. 2 and 3 include a network switch 206 and an optical transceiver 208. The server side 204 of FIG. 2 includes an optical transceiver 210, servers 212A, 212B, 212C, and 212D, which are collectively referred to as the servers 212, and servers 219A, 210B, 219C, and 219D, which are collectively referred to as the servers 219. The server sides 304A and 304B of FIG. 3 respectively includes optical transceivers 310A and 310B, which are collectively referred to as the transceivers 310. The server side 304A includes servers 312A, 312B, 312C, and 312D, which are collectively referred to as the servers 312, and the server side 304B includes servers 313A, 313B, 313C, and 313D, which are collectively referred to as the servers 313.

Therefore, in the example of each of FIGS. 2 and 3, there are eight servers, which are at a single server side 204 in FIG. 2 and at two server sides 304 in FIG. 3. Each server side 204 and 304 includes one optical transceiver 210 and 310, respectively. As such, in the example system 200 of FIG. 2, there is one server-side optical transceiver 210 servicing eight servers 212 and 219, whereas in the example system 300 of FIG. 3, there are two server-side optical transceivers 310 servicing the same number of servers 312 and 313.

The switch 206 in the examples of both FIGS. 2 and 3 include eight network ports labeled P0, P1, P2, P3, P4, P5, P6, and P7 that each have one utilized network lane labeled L0; the lanes L1, L2, and L3 of each port are not used. The components of the optical transceiver 208 depicted in FIGS. 2 and 3 are those of the transmission section of this transceiver 208. The optical transceiver 208 includes electrical inputs 213A, 213B, 213C, and 213D, collectively referred to as the inputs 213 and respectively connected to the network lane L0 of the network ports P0, P1, P2, and P3. The optical transceiver 208 includes electrical inputs 215A, 215B, 215C, and 215D, collectively referred to as the inputs 215 and respectively connected to the network lane L0 of the network ports P4, P5, P6, and P7.

The optical transceiver 208 of FIGS. 2 and 3 includes hardware logic 214. The optical transceiver 208 includes optical transmitters 216A, 216B, 216C, and 216D, which are collectively referred to as the transmitters 216, and optical transmitters 217A, 217B, 217C, and 217D, which are collectively referred to as the transmitters 217. In the first switchable mode of FIGS. 2 and 3, the hardware logic 214 maps the electrical inputs 213A, 213B, 213C, and 213D to the optical transmitters 216A, 216B, 216C, and 216D, respectively. The hardware logic 214 maps the electrical inputs 215A, 215B, 215C, and 215D to the optical transmitters 217A, 217B, 217C, and 217D, respectively. Therefore, the optical transmitters 216 optically transmit the data received at the inputs 213, and the optical transmitters 217 optically transmit the data received at the inputs 215.

The optical transceiver 208 of FIGS. 2 and 3 includes multiplexers 220A and 220B, which are collectively referred to as the multiplexers 220. The multiplexers 220 wave-division multiplex the data transmitted by the optical transmitters 216 and 217. Specifically, the multiplexer 220A multiplexes the data transmitted by the optical transmitters 216 onto four corresponding wavelengths of the optical fiber 218A, and the multiplexer 220B multiplexes the data transmitted by the optical transmitters 217 onto four corresponding wavelengths of the optical fiber 218B. The optical fibers 218A and 218B are collectively referred to as the optical fibers 218.

In the example of FIG. 2 specifically, each server 212 and 219 includes one network port labeled P0 that each has two network lanes labeled L0 and L1. However, just the network lane L0 of the network port P0 of each server 212 and 219 is utilized in the first switchable mode. The components of the optical transceiver 210 depicted in FIG. 2 are those of the reception section of this transceiver 210. The optical transceiver 210 includes electrical outputs 221A, 221B, 221C, 221D, 221E, 221F, 221G, and 221H, which collectively referred to as the outputs 221. The electrical outputs 221A, 221B, 221C, 221D, 221E, 221F, 221G, and 221H are respectively connected to the network lane L0 of the network port P0 of the servers 212A, 212B, 212C, 212D, 219A, 219B, 219C, and 219D.

The optical transceiver 210 of FIG. 2 includes hardware logic 222. The optical transceiver 210 includes optical receivers 224A, 224B, 224C, and 224D, which are collectively referred to as the receivers 224, and optical receivers 226A, 226B, 226C, and 226D, which are collectively referred to as the receivers 226. In the first switchable mode of FIG. 2, the hardware logic 222 respectively maps the electrical outputs 221A, 221B, 221C, and 221D to the optical receivers 224A, 224B, 224C, and 224D. In the first switchable mode, the hardware logic 222 similarly maps the electrical outputs 221E, 221F, 221G, and 221H to the optical receivers 226A, 226B, 226C, and 226D. The data received by the optical receivers 224 are thus transmitted at the outputs 221A, 221B, 221C, and 221D, and the data received by the optical receivers 226 are thus transmitted at the outputs 221E, 221F, 221G, and 221H.

The optical transceiver 210 of FIG. 2 includes demultiplexers 228A and 228B, which are collectively referred to as the demultiplexers 228. The demultiplexers 228 wave-division demultiplex the multiplexed data received by the optical receivers 224 and 226 over the optical fibers 218 from the server side 202. Specifically, the demultiplexer 228A wave-division demultiplexes the four wavelengths of multiplexed data received on the optical fiber 218A to the optical receivers 224, and the demultiplexer 228B wave-division demultiplexes the four wavelengths of multiplexed data received on the optical fiber 218B to the optical receivers 226. Therefore, the servers 212A, 212B, 212C, and 212D respectively receive data from the network lane L0 of network ports P0, P1, P2, and P3 of the switch 206, and the servers 219A, 219B, 219C, and 219D respectively receive data from the lane L0 of ports P4, P5, P6 and P7 of the switch 206.

In the example of FIG. 3 specifically, the server side 304A, which includes the optical transceiver 310A and the servers 312, and which receives multiplexed data over the optical fiber 218A, is described in detail. However, operation of the server side 304B, which includes the optical transceiver 310B and the servers 313, and which receives multiplexed data over the optical fiber 218B, operates in the same manner. As to the server side 304A, then, just the network lane L0 of the network port P0 of each server 312 is utilized; the lane L1 of the port P0 of each server 312 is not utilized. The components of the optical transceiver 310A depicted in FIG. 3 are those of the reception section of this transceiver 310A. The optical transceiver 310A includes electrical outputs 321A, 321B, 321C, and 321D, which are collectively referred to as the outputs 321, and electrical outputs 323A, 323B, 323C, and 323C, which are collectively referred to as the outputs 323. The electrical outputs 321A, 321C, 323A, and 323C are respectively connected to the network lane L0 of the network port P0 of the servers 312A, 312B, 312C, and 312D. The electrical outputs 321B, 321D, 323B, and 323D are respectively connected to the network lane L1 of the network port P0 of the servers 312A, 312B, 312C, and 212D.

The optical transceiver 310A of FIG. 3 includes hardware logic 322. The optical transceiver 310A includes optical receivers 324A, 324B, 324C, and 324D, which are collectively referred to as the receivers 324, and optical receivers 325A, 325B, 325C, and 325D, which are collectively referred to as the receivers 325. In the first switchable mode of FIG. 3, the hardware logic 322 respectively maps the electrical outputs 321A, 321C, 323A, and 323C to the optical receivers 324A, 324B, 324C, and 324D. The other electrical outputs 321B, 321D, 323B, and 323D are not used in the first switchable mode. No electrical outputs 321 and 323 are mapped to the optical receivers 325, and the optical receivers 325 are likewise not used in the first switchable mode. The data received by the optical receivers 324 are thus transmitted at the outputs 321B, 321D, 323B, and 323D.

The optical transceiver 310 of FIG. 3 includes demultiplexers 328A and 328B, which are collectively referred to as the demultiplexers 328B. The demultiplexer 328A wave-division demultiplexes the multiplexed data received by the optical receivers 324 over the optical fiber 218A from the server side 304A. That is, the demultiplexer 328A wave-division demultiplexes the four wavelengths of multiplexed data received on the optical fiber 218A to the optical receivers 324. Therefore, the servers 312A, 312B, 312C, and 312D respectively receive data from the network lane L0 of network ports P0, P1, P2, and P3 of the switch 206. The demultiplexer 328B is not used in the first switchable mode.

A comparison of FIG. 3 to FIG. 2 thus shows that in the first switchable mode, the number of server sides (one server side 204 in FIG. 2, and two server sides 304 in FIG. 3), dictates how the optical receivers of the optical transceiver of each server side are mapped to the electrical outputs. That is, in FIG. 2, the optical receivers 224 are mapped to the electrical outputs 221A, 221B, 221C, and 221D, and the receivers 226 are mapped to the outputs 221E, 221F, 221G, and 221H. By comparison, in FIG. 3, the optical receivers 324 of the server side 304A are mapped to the electrical outputs 321A, 321C, 323A, and 323C, the optical receivers 325 of the server side 304A are not mapped to any electrical outputs. The optical receivers of the server side 304B in FIG. 3 are mapped in a similar manner to the optical receivers 324 and 325 of the server side 304A.

FIGS. 4 and 5 show example systems 400 and 500, respectively, in which switch-side and server-side optical transceivers operate according to the second switchable mode. The systems 400 and 500 include a switch side 402. The system 400 of FIG. 4 includes one server side 404, whereas the system 500 of FIG. 5 includes two server sides 504A and 504B, which are collectively referred to as the server sides 504.

The switch side 402 of the systems 400 and 500 of FIGS. 4 and 5 include a network switch 406 and the optical transceiver 208. The server side 404 of FIG. 4 includes the optical transceiver 210, servers 212A and 212B, which are collectively referred to as the servers 212, and servers 219A and 219B, which are collectively referred to as the servers 219. The server sides 504A and 504B of FIG. 5 respectively include the optical transceivers 310A and 310B, servers 312A and 312B, which are collectively referred to as the servers 312, and servers 313A and 313B, which are collectively referred to as the servers 313.

Therefore, in the example of each of FIGS. 4 and 5, there are four servers, which are at a single server side 404 in FIG. 4 and at two server sides 504 in FIG. 5. Each server side 404 and 504 includes one optical transceiver 210 and 310, respectively. As such, in the example system 400 of FIG. 4, there is one server-side optical transceiver 210 servicing four servers 312 and 313, whereas in the example system 500 of FIG. 4, there are two server-side optical transceivers 310 servicing the same number of servers 312 and 313.

The switch 406 in the examples of both FIGS. 4 and 5 includes at least two network ports labeled P0 and P1 that each have two utilized network lanes labeled L0 and L1. The optical transceiver 208 depicted in FIGS. 4 and 5 includes the same components that are depicted in and that have been described in relation to FIGS. 2 and 3. The description of the optical transceiver 208 as to FIGS. 2 and 3 is not duplicated as to FIGS. 4 and 5, except where the transceiver 208 differs in FIGS. 4 and 5 as compared to FIGS. 2 and 3.

In FIGS. 4 and 5, the electrical inputs 213A, 213B, 213C, and 213D are respectively connected to the network lane L0 of the network port P0, the lane L1 of the port P0, the network lane L0 of the network port P1, and the lane L1 of the port P1. The electrical inputs 215A, 215B, 215C, and 215D are respectively connected to the network lane L0 of the network port P2, the lane L1 of the port P2, the network lane L0 of the network port P3, and the lane L1 of the port P3. Therefore, FIGS. 4 and 5 differ from FIGS. 2 and 3 in that the inputs 213 and 215 are configured, connected or mapped to different ports and lanes of the switch 406 in FIGS. 4 and 5 as compared to the ports and lanes of the switch 206 to which the inputs 213 and 215 are configured, connected or mapped in FIGS. 2 and 3. That is, the same switch 206 can be used in FIGS. 4 and 5 as that used in FIGS. 2 and 3, but with a different configuration. In FIGS. 4 and 5, lanes L2 and L3 of each port P0, P1, P2, and P3 remain unused, and all lanes L0, L1, L2, and L3 of each port P4, P5, P6, and P7 remain unused.

In the example of FIG. 4, specifically, each server 212 and 219 includes one network port labeled P0 that each has two network lanes labeled L0 and L1, as in FIG. 2. However, in FIG. 4, both network lanes L0 and L1 of the network port P0 of each server 212 and 213 are utilized in the second switchable mode. Furthermore, in FIG. 4, the optical transceiver 210 includes the same components that are depicted in and that have been described in relation to FIG. 2. The description of the optical transceiver 210 as to FIG. 2 is not duplicated as to FIG. 4, except where the transceiver 210 differs in FIG. 4 as compared to FIG. 2. In FIG. 4, the electrical outputs 221A, 221B, 221C, and 221D are respectively connected to the network lane L0 of the network port P0 of the server 212A, the lane L1 of the port P0 of the server 212A, the lane L0 of the port P0 of the server 212B, and the lane L1 of the port P0 of the server 212B. The electrical outputs 221E, 221F, 221G, and 221H are respectively connected to the network lane L0 of the network port P0 of the server 219A, the lane L1 of the port P0 of the server 219A, the lane L0 of the port P0 of the server 219B, and the lane L1 of the port P0 of the server 219B.

In FIG. 4, the server 212A receives data from the network lanes L0 and L1 of the network port P0 of the switch 406, at the network lanes L0 and L1, respectively, of the network port P0 of the server 212A. The server 212B receives data from the network lanes L0 and L1 of the network port P1 of the switch 406, at the network lanes L0 and L1, respectively, of the network port P0 of the server 212B. The server 219A receives data from the network lanes L0 and L1 of the network port P2 of the switch 406, at the network lanes L0 and L1, respectively, of the network port P0 of the server 219A. The server 219B receives data from the network lanes L0 and L1 of the network port P3 of the switch 406, at the network lanes L0 and L1, respectively, of the network port P0 of the server 219B.

In the example of FIG. 5, specifically, the server side 504A, which includes the optical transceiver 310A and the servers 312, and which receives multiplexed data over the optical fiber 218A, is described. However, operation of the server side 504B, which includes the optical transceiver 310B and the servers 313, and which receives multiplexed data over the optical fiber 218B, operates in the same manner. As to the server side 504A, then, just the network lanes L0 and L1 of the network port P0 of each server 312 is utilized; the lanes L2 and L3 of the port P0 of each server 312 is not utilized. In FIG. 5, the optical transceiver 310A includes the same components that are depicted in and that have been described in relation to FIG. 3. The description of the optical transceiver 310A as to FIG. 3 is not duplicated as to FIG. 5, except where the transceiver 310A differs in FIG. 5 as compared to FIG. 3.

The electrical outputs 321A, 321B, 321C, and 321D are respectively connected to the network lane L0 of the network port P0 of the server 312A, the lane L1 of the port P0 of the server 312A, the lane L2 of the port P0 of the server 312A, and the lane L3 of the port P0 of the server 312A. The electrical outputs 323A, 323B, 323C, and 323D are respectively connected to the network lane L0 of the network port P0 of the server 312B, the lane L1 of the port P0 of the server 312B, the lane L2 of the port P0 of the server 312B, and the lane L3 of the port P0 of the server 312B. In the second switchable mode of FIG. 5, the hardware logic 322 respectively maps the electrical outputs 321A, 321B, 323A, and 323B to the optical receivers 324A, 324B, 324C, and 324D. The other electrical outputs 321C, 321D, 323C, and 323D are not used in the second switchable mode. The server 312A receives data from the network lanes L0 and L1 of the network port P0 of the switch 406, at the network lanes L0 and L1, respectively, of the network port P0 of the server 312A. The server 312B receives data from the network lanes L0 and L1 of the network port P1 of the switch 406, at the network lanes L0 and L1, respectively, of the network port P0 of the server 312B.

A comparison of FIG. 5 to FIG. 4 thus shows that in the second switchable mode, the number of server sides (one server side 404 in FIG. 4, and two server sides 504 in FIG. 5), dictates how the optical receivers of the optical transceiver of each server side are mapped to the electrical outputs. That is, in FIG. 4, the optical receivers 224 are mapped to the electrical outputs 221A, 221B, 221C, and 221D, and the receivers 226 are mapped to the outputs 221E, 221F, 221G, and 221H. By comparison, in FIG. 5, the optical receivers 324 of the server side 504A are mapped to the electrical outputs 321A, 321B, 323A, and 323B, and the optical receivers 325 of the server side 304A are not mapped to any electrical outputs. The optical receivers of the server side 504B in FIG. 5 are mapped in a similar manner to the optical receivers 324 and 325 of the server side 504A.

Furthermore, a comparison of FIG. 4 to FIG. 2 shows that when there is one server side, the mapping of optical receivers to electrical outputs is the same regardless of whether the first switchable mode has been selected as in FIG. 2, or the second switchable mode has been selected as in FIG. 4. Rather, the difference between FIGS. 2 and 4 is how the electrical outputs are connected to the servers, particularly the network lanes thereof. A comparison of FIG. 5 to FIG. 3, however, shows that when there are two server sides, the mapping of optical receivers to electrical outputs is different depending on whether the first switchable mode has been selected as in FIG. 3, or the second switchable mode has been selected as in FIG. 5.

FIG. 6 shows an example system 600, in which switch-side and server-side optical transceivers operate according to the third switchable mode. The system 600 includes a switch side 602, and one server side 604. The switch side 602 includes a network switch 606 and the optical transceiver 208. The server side 604 includes the optical transceiver 210, and servers 612 and 613. In the example of FIG. 6, therefore, there are two servers 612 and 613 at a single server side 604; one optical transceiver 210 services both servers 612 and 613.

The switch 606 in the example of FIG. 6 includes two network ports labeled P0 and P1 that each have four utilized network lanes labeled L0, L1, L2, and L3. The optical transceiver 208 includes the same components that are depicted in and that have been described in relation to FIGS. 2 and 3. The description of the optical transceiver 208 as to FIGS. 2 and 3 is not duplicated as to FIG. 6, except where the transceiver 208 differs in FIG. 6 as compared to FIGS. 2 and 3.

In FIG. 6, the electrical inputs 213A, 213B, 213C, and 213D are respectively connected to the network lanes L0, L1, L2, and L3 of the network port P0. The electrical inputs 215A, 215B, 215C, and 215D are respectively connected to the network lanes L0, L1, L2, and L3 of the network port P1. Therefore, FIG. 6 differs from FIGS. 2 and 3 in that the inputs 213 and 215 are configured, connected or mapped to different ports and lanes of the switch 606 in FIG. 6 as compared to the ports and lanes of the switch 206 to which the inputs 213 and 15 are configured, connected or mapped in FIGS. 2 and 3. That is, the same switch 206 can be used in FIG. 6 as that used in FIGS. 2 and 3, but with a different configuration. In FIG. 6, all lanes L0, L1, L2, and L3 of each port P2, P3, P4, P5, P6, and P7 remain unused.

In FIG. 6, each server 612 and 613 includes one network port labeled P0 that each has four utilized network lanes labeled L0, L1, L2, and L3. In FIG. 6, the optical transceiver 210 includes the same components that are depicted in and that have been described in relation to FIG. 2. The description of the optical transceiver 210 as to FIG. 2 is not duplicated as to FIG. 6, except where the transceiver 210 differs in FIG. 6 as compared to FIG. 2. In FIG. 6, the electrical outputs 221A, 221B, 221C, and 221D are respectively connected to the network lanes L0, L1, L2, and L3 of the network port P0 of the server 612. The electrical outputs 223A, 223B, 223C, and 223D are respectively connected to the network lanes L0, L1, L2, and L3 of the network port P0 of the server 613. The server 612 receives data from the network lanes L0, L1, L2, and L3 of the network port P0 of the switch 606, at the network lanes L0, L1, L2, and L3, respectively, of the network port P0 of the server 612. The server 613 receives data from the network lanes L0, L1, L2, and L3 of the network port P1 of the switch 606, at the network lanes L0, L1, L2, and L3, respectively, of the network port P0 of the server 613.

A comparison of FIG. 6 to FIGS. 2 and 4 shows that when there is one server side, the mapping of optical receivers to electrical outputs is the same. Such mapping is the same regardless of whether the first switchable mode has been selected as in FIG. 2, the second switchable mode has been selected as in FIG. 4, or the third switchable mode has been selected has in FIG. 6. Rather, the difference among FIGS. 2, 4, and 6 is how the electrical outputs are connected to the servers, including the network lanes thereof.

In each of FIGS. 2, 3, 4, 5, and 6, the base transmission bandwidth is achieved at each network lane. The difference in the achieved transmission bandwidth at each server is determined by the number of network lanes of each server that are connected to an optical transceiver at the server side. In the first switchable mode of FIGS. 2 and 3, the base transmission bandwidth is achieved at each server, because just one network lane of each server is connected to an optical transceiver. In the second switchable mode of FIGS. 4 and 5, twice the base transmission bandwidth is achieved at each server, because two network lanes of each server are connected to an optical transceiver. In the third switchable mode of FIG. 6, four times the base transmission bandwidth is achieved at each server, because four network lanes of each server are connected to an optical transceiver.

Figure 7:
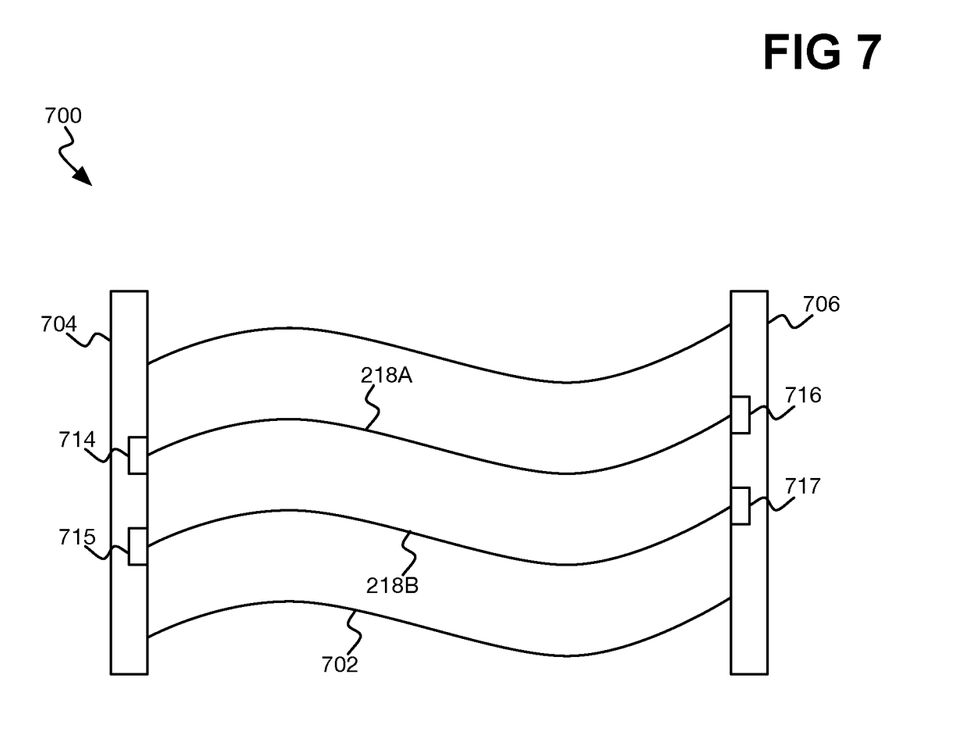
FIG. 7 is a diagram of an example optical cable that can be used alone in the systems of FIGS. 2, 4, and 6 and in conjunction with another optical cable in the systems of FIGS. 3 and 5.

FIG. 7 shows an example optical cable 700 that can be used in the systems of FIGS. 2, 4, and 6 that have been described, in which there is a switch side and one server side. The optical cable 700 can be referred to as a straight cable. The optical cable 700 includes just one cable segment 702 including both optical fibers 218. The optical fibers 218 can be referred to as optical transmission fibers from the perspective of the switch side, because data is transmitted over the fibers 218 from the switch side to the server side. The cable segment 702 can also include corresponding optical reception fibers from the perspective of the switch side as well, over which data is transmitted from the server side to the switch side.

The cable segment 702 has a switch-side connector 704 and a server-side connector 706. The switch-side connector 704 is physically connected to a corresponding connector at the switch side, for communicative connection to the optical transceiver 208 of FIG. 2, 4, or 6 at the switch side. The fibers 218A and 218B are connected to connector positions 714 and 715, respectively, on the switch-side connector 704. The server-side connector 706 is physically connected to a corresponding connector at the server side, for communicative connection to the optical transceiver 210 of FIG. 2, 4, or 6 at the server side. The fibers 218A and 218B are connected to connector positions 716 and 717, respectively, on the server-side connector 706. The cable segment 702 extends between the connectors 704 and 706.

Figure 8:
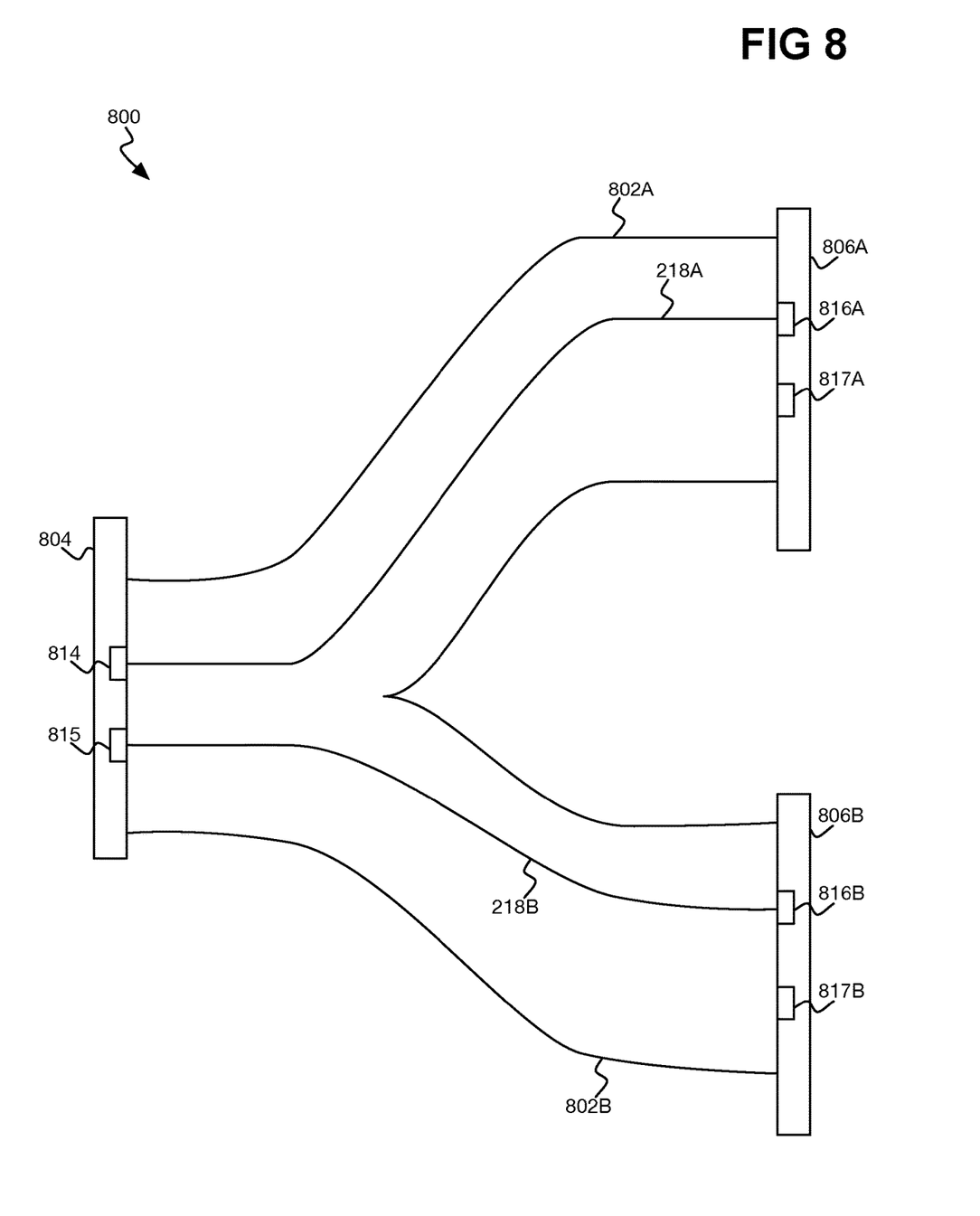
FIG. 8 is a diagram of an example optical cable that can be used alone or in conjunction with another optical cable in the systems of FIGS. 3 and 5.

FIG. 8 shows an example optical cable 800 that can be used in the systems of FIGS. 3 and 5 that have been described, in which there is a switch side and two server sides. The optical cable 800 can be referred to as a Y-cable. The optical cable 800 includes a cable segment 802A and a cable segment 802B, which are collectively referred to as the cable segments 802. The cable segment 802A includes the optical fiber 218A, and the cable segment 802B includes the optical fiber 218B. As noted above, the optical fibers 218 can be referred to as optical transmission fibers. Each cable segment 802 can include a corresponding optical reception fiber as well, such that each cable segment 802 can include just one optical transmission fiber and just one optical reception fiber.

The cable segments 802 terminate at a switch-side connector 804. The fibers 218A and 218B are connected to connector positions 814 and 815, respectively, on the switch-side connector 804. The switch-side connector is physically connected to a corresponding connector at the switch side, for communicative connection to the optical transceiver 208 of FIG. 3 or 5 at the switch side. The cable segments 802A and 802B also respectively terminate at server-side connectors 806A and 806B, which are collectively referred to as the server-side connectors 806. The fibers 218A and 218B are connected to a connector position 816A of the server-side connector 806A and a connector position 816B of the server-side connector 806B, respectively. The server-side connector 806A is communicatively connected to the optical transceiver 310A of FIG. 3 or 5 at the server side, and the server-side connector 806B is communicatively connected to the optical transceiver 310B of FIG. 3 or 5.

By comparison, connector positions 817A and 817B of the server-side connectors 806A and 806B, respectively, have no fiber connections. As such, referring to FIG. 3 and FIG. 5, the optical receivers 325 of the optical transceiver 310A and the bottom optical receivers of the optical transceiver 310B have no optical fiber connections. In the implementation of FIG. 8, these receivers detect that they are not receiving optical signals, which permits the transceivers 310 (such as by their hardware logic) to detect configuration in the second switchable mode. That is, the second switchable mode is selected based on how the optical cable 800 interconnects the switch-side optical transceiver to the server-side optical transceivers In one implementation, each server-side connector 806 is physically connected to a corresponding connector at the server side. In a second implementation, each server-side connectors 806 is physically connected to an intermediary straight cable, like the optical cable 700, which is itself physically connected to a corresponding connector at the server side. In this second implementation, just the fiber 218A is used in each intermediary straight cable. In a third implementation, one server-side connector 806 is physically connected to a corresponding connector at the server side, and the other server-side connector 806 is physically connected to an intermediary straight cable that is itself physically connected to a corresponding connector at the server side. In this third implementation, just the fiber 218A is used in the intermediary straight cable. Regardless of implementation, the cable segment 802A extends between the connectors 804 and 806A via the fiber 218A, and the cable segment 802B extends between the connectors 804 and 806B via the fiber 218B.

The techniques that have been described permit the same type of optical transceiver to be used at the switch side and at the server side for deployment in different architectural network topologies that have been shown in FIGS. 2-6. At the switch side, just one optical transceiver can be used. At the server side, just one optical transceiver can be used, as in FIGS. 2, 4, and 6, or just two optical transceivers can be used, as in FIGS. 3 and 5. This flexibility in usage of an optical transceiver and the reduction of the number of optical transceivers needed to achieve a particular architectural network topology both reduce capital and operational expenses. Furthermore, the same switch with switch-side optical transceivers and the same server(s) with server-side optical transceivers can be used for different bandwidths, depending on whether straight or Y-cables connect the former with the latter.

We claim:

1. A system comprising:
an optical cable having a plurality of optical transmission fibers;
a switch-side optical transceiver having a plurality of switch-side electrical inputs and a plurality of switch-side optical outputs corresponding to the optical transmission fibers over which a plurality of optical transmitters of the switch-side transceiver transmit wave-division multiplexed data, each switch-side input corresponding to a selected switch port of a plurality of network switch ports and a selected network switch lane of the selected switch port; and
one or more server-side optical transceivers having a plurality of server-side electrical outputs and a plurality of server-side electrical inputs corresponding to the optical transmission fibers over which a plurality of optical receivers of the server-side transceiver receive the wave-division multiplexed data, each switch-side output corresponding to a selected server port of a plurality of network server ports and a selected network server lane of the selected server port,
wherein the switch-side transceiver comprises switch-side hardware logic to differently map the switch-side inputs to the transmitters according to a selected mode of a plurality of switchable modes corresponding to different transmission bandwidths,
and wherein each server-side transceiver comprises server-side hardware logic to differently map the server-side outputs to the receivers according to the selected mode.

2. The system of claim 1, wherein the switchable modes comprise:
a first switchable mode corresponding to a base data transmission bandwidth; and
a second switchable mode corresponding to twice the base data transmission bandwidth.

3. The system of claim 2, wherein the switchable modes further comprise:
a third switchable mode corresponding to four times the base transmission bandwidth.

4. The system of claim 3, wherein in the third switchable mode:
the switch-side hardware logic uses four switch lanes of each switch port in mapping the switch-side inputs to the transmitters,
the server-side hardware logic uses four server lanes of each server port in mapping the server-side outputs to the receivers,
the one or more switch-side transceivers include just one switch-side transceiver,
and the optical cable comprises just one segment corresponding to the just one switch-side transceiver and including all the optical transmission fibers.

5. The system of claim 1, wherein in different of the switchable modes, the switch-side inputs are differently mapped to the transmitters, and the server-side outputs are differently mapped to the receivers.

6. The system of claim 1, wherein the server-side optical transceivers comprise just one server-side optical transceiver, and wherein the optical cable comprises:
just one segment including all the optical transmission fibers;
a switch-side connector to which the switch-side optical transceiver is communicatively connected; and
a server-side connector to which the just one server-side optical transceiver communicatively is connected, wherein the one segment extends from the switch-side connector to the server-side connector.

7. The system of claim 1, wherein the server-side optical transceivers comprise more than one server-side optical transceiver, and wherein the optical cable comprises:
   a plurality of segments, each segment including just one optical transmission fiber;
   a switch-side connector to which the switch-side optical transceiver is communicatively connected; and
   a plurality of server-side connectors, each server-side optical transceiver communicatively connected to a corresponding server-side connector,
   wherein each segment extends from the switch-side connector to a corresponding server-side connector.

8. The system of claim 7, further comprising a plurality of optical straight cables, each optical straight cable comprising:
   a first end physically connected to a corresponding server-side connector of the optical cable;
   a second end communicatively connected to a corresponding server-side optical transceiver; and
   an optical transmission fiber.

9. The system of claim 7, wherein each server-side connector comprises:
   a first connector position connected to the optical transmission fiber of the segment to which the server-side connector is connected; and
   a second connector position not connected to any optical transmission fiber.

10. The system of claim 1, wherein the switch-side optical transceiver and the server-side optical transceiver automatically negotiate with one another the selected mode from the switchable modes, based on a number of servers connected to the server-side outputs and how the servers are connected to the server-side outputs.

11. The system of claim 1, wherein the switch-side optical transceiver and the server-side optical transceiver automatically negotiate with one another the selected mode from the switchable modes, based on a desired data transmission bandwidth.

12. The system of claim 1, wherein the switch-side optical transceiver and the server-side optical transceiver automatically negotiate with one another the selected mode from the switchable modes, based on how the optical cable interconnects the switch-side optical transceiver to the server-side optical transceivers.

* * * * *